(12) United States Patent
Chung

(10) Patent No.: US 7,269,003 B1
(45) Date of Patent: Sep. 11, 2007

(54) EXTERNAL BOX FOR HARD DISK DRIVES

(75) Inventor: Ming-Tsai Chung, Taipei (TW)

(73) Assignee: D-Link Corporation, Taipei (TW)

( * ) Notice: Subject to any disclaimer, the term of this patent is extended or adjusted under 35 U.S.C. 154(b) by 0 days.

(21) Appl. No.: 11/500,975

(22) Filed: Aug. 9, 2006

(51) Int. Cl.
*G06F 1/16* (2006.01)

(52) U.S. Cl. .................... 361/685; 29/25.35; 165/185; 361/752

(58) Field of Classification Search ............... 29/25.35; 165/80.2–80.4, 185; 174/15.1–15.3; 361/752, 361/679–687, 724–727
See application file for complete search history.

(56) References Cited

U.S. PATENT DOCUMENTS 5,519,572 A * 5/1996 Luo ........................... 361/685

2004/0184245 A1* 9/2004 Yokote et al. .............. 361/752
2004/0216289 A1* 11/2004 Ikeda et al. ................ 29/25.35

* cited by examiner

*Primary Examiner*—Hung Van Duong
(74) *Attorney, Agent, or Firm*—Bacon & Thomas, PLLC

(57) ABSTRACT

The present invention is to provide an external box for containing one or more HDDs, which comprises a housing; an abutment plate fitted on a front surface of the housing and including at least one slit and at least one first positioning member both on either side; and a panel including at least one latch and at least one second positioning member both on either side. The latches are adapted to insert into the slits and the second positioning members are adapted to securely engage with the first positioning members so as to secure the panel onto the front surface of the housing from a first direction without involving any tools. Alternatively, a user can detach the panel from the housing from a second opposite direction also without involving any tools.

3 Claims, 5 Drawing Sheets

US 7,269,003 B1

EXTERNAL BOX FOR HARD DISK DRIVES

FIELD OF THE INVENTION

The present invention relates to external box for hard disk drives (HDDs) and more particularly to such an external box which enables a user to easily replace a HDD without involving detaching its housing and using tools for panel disassembly.

BACKGROUND OF THE INVENTION

Nowadays, information from millions of sources is stored in electronic files. Conventionally, most electronic files, in addition to text, further include pictures, sound, and video. As such, size of an electronic file grows significantly. Moreover, features provided by software increase greatly. This in turn greatly increases the sizes of various types of software. In another aspect, very few kinds of available portable storage devices (e.g., MOs, ZIPs, CD-Rs, memory cards, etc.) are capable of storing electronic files and application software.

Currently, only a hard disk drive (HDD), having features of being portable, mass storage, adapted to connect to a data communication interface (i.e., port) on a main board of a computer, and inexpensive, is capable of eliminating the above problem. Thus, a type of "external box for HDD" is produced by an electronics manufacturer and is commercially available. Typically, there are two types of external box of HDD commercially available.

(i) The first one comprises an outer housing and an inner housing. The outer housing is affixed to a computer case and comprises a circuit board on its bottom. The circuit board comprises a port. A cable is provided externally of the outer housing and is electrically connected to the circuit board. The cable is further electrically connected to a data communication interface on a main board of a computer. A HDD is mounted in the inner housing. Next, mount the inner housing in the outer housing by inserting through an opening on the computer case by connecting a connector of the HDD to the port. Thereafter, electronic files and application software can be installed in the HDD for storage. A user may remove the inner housing out of the outer housing prior to replacing a HDD. However, the first type of external box involves an installation of an outer housing by detaching a computer case. Further, it undesirably consumes a precious internal space of the computer case. Furthermore, only one HDD per replacement is allowed. In addition, it operation is very inconvenient.

(ii) The second one comprises a seat, a housing, and a panel. A HDD is mounted on the seat. A bottom plate is provided below a bottom of the seat. A circuit board is mounted on a surface of the bottom plate facing the seat. A port is provided on the circuit board and is adapted to connect to a connector of the HDD. A second port is provided on a bottom of the circuit board. The housing is mounted on the seat. The panel is provided on a surface of the housing facing the seat. A cable (e.g., USB cable) is interconnected the external second port and a data communication interface (e.g., USB port) on a computer case. Thereafter, electronic files and application software can be installed in the HDD for storage. However, the second type of external box suffered from a disadvantage. For example, the seat is threadedly secured to the panel by screws. Thus, it is impossible of removing the seat out of the housing if no suitable tools for panel disassembly are available to a user.

Thus, it is desirable to provide a novel external box which enables a user to easily replace a HDD without involving detaching a computer case and using tools for panel disassembly.

SUMMARY OF THE INVENTION

After considerable research and experimentation, an external box for hard disk drives according to the present invention has been devised so as to overcome the above drawbacks of the prior art.

It is an object of the present invention to provide an external box for containing one or more HDDs, the external box comprises a housing; an abutment plate fitted on a front surface of the housing, the abutment plate including at least one slit and at least one first positioning member both on either side; and a panel including at least one latch and at least one second positioning member both on either side. The latches are adapted to insert into the slits and the second positioning members are adapted to securely engage with the first position members so as to secure the panel onto the front surface of the housing from a first direction without involving any tools. Alternatively, a user can detach the panel from the housing from a second opposite direction also without involving any tools.

The above and other objects, features and advantages of the present invention will become apparent from the following detailed description taken with the accompanying drawings.

DETAILED DESCRIPTION OF THE PREFERRED EMBODIMENTS

Figure 1:
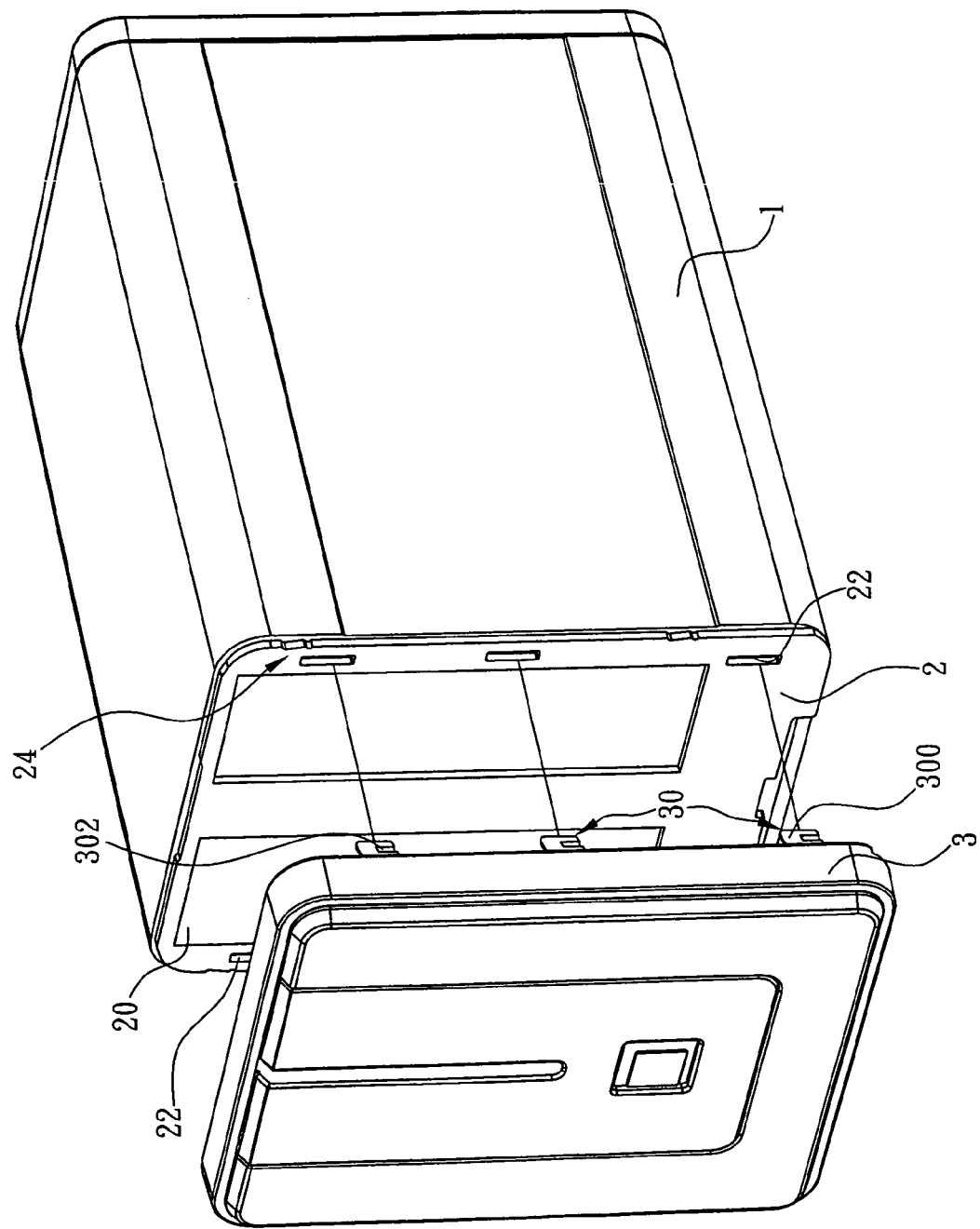
FIG. 1 is an exploded perspective view of a preferred embodiment of external box for HDDs according to the invention.
Figure 2:
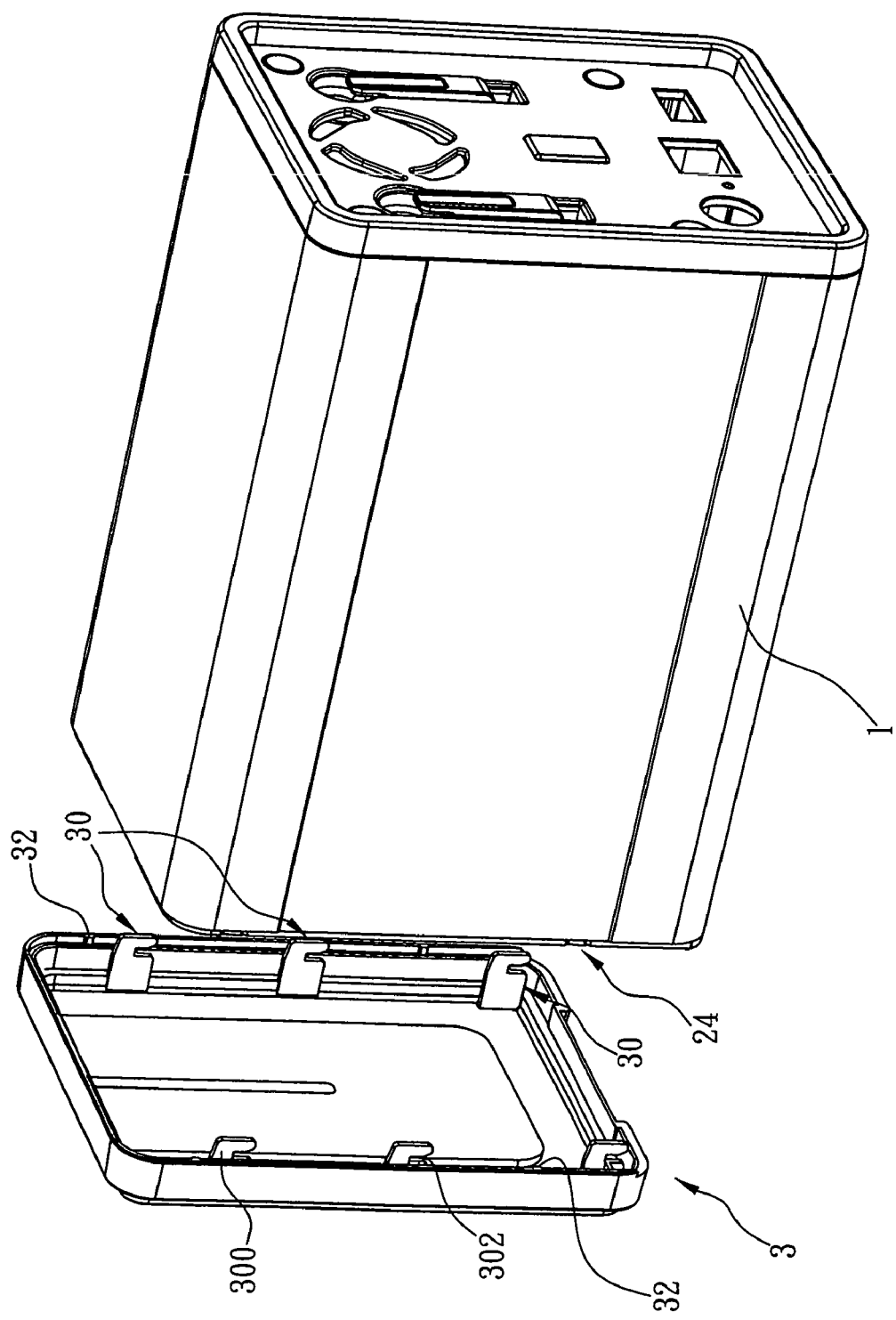
FIG. 2 is a view similar to FIG. 1 but from an opposite angle.

Referring to FIGS. 1 and 2, an external box for HDDs in accordance with a preferred embodiment of the invention comprises a rectangularly shaped housing 1 including a rectangular abutment plate 2 fitted on a front surface of the housing 1. The abutment plate 2 comprises at least one rectangular opening (two are shown) 20 in communication with inside of the housing 1. A HDD is adapted to install in the housing 1 through each opening 20. At least one slit 22 is formed proximate a periphery of the abutment plate 2 with the openings 20 disposed therebetween (three are shown on either side of the abutment plate 2). At least one first positioning member 24 is formed on a periphery of the abutment plate 2 (two are shown on either side of the abutment plate 2). A separate rectangular panel 3 is provided to snugly fit onto the abutment plate 2 to conceal same in order to form a whole external box with the housing 1. The panel 3 comprises at least one latch 30 along its periphery of its inner surface facing the housing 1 (three are shown on either side of the panel 3). At least one second positioning member 32 is formed on a periphery of the panel 3 (two are shown on either side of the panel 3). The latches 30 are adapted to insert into the slits 22 and the second positioning members 32 are also adapted to securely engage with the first positioning members 24. As an end, the panel 3 is secured onto the front surface of the housing 1.

Figure 3:
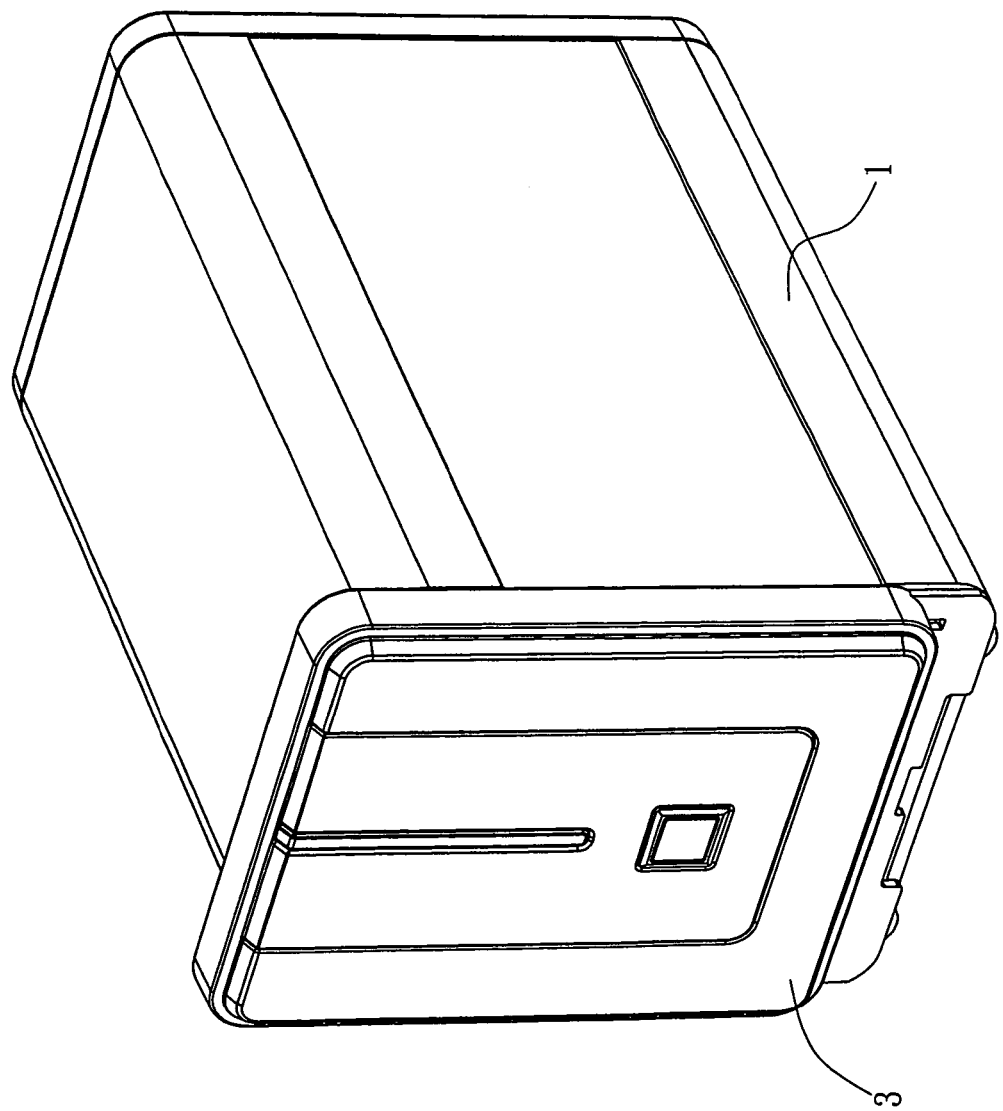
FIG. 3 is a perspective view of the assembled external box.

In the invention the latch 30 is a substantially rectangular piece 300 having a front end integrally formed with the panel 3 and a rear open end extending toward the housing 1. The piece 300 comprises a cavity 302 on its lower side between both ends. Referring to FIG. 3 in conjunction with FIGS. 1 and 2, for mounting the panel 3 onto the housing 1, first line up the cavities 302 with the slits 22. Next, push the panel 3 toward the housing 1 until the periphery of the panel 3 abuts on the periphery of the abutment plate 2 onto the housing 1. At this time, a portion of the panel 3 is inserted through the slits 22. Next, move the panel 3 to cause the cavities 302 to be close to bottoms of the slits 22 until blind ends of the cavities 302 rest upon the bottoms of the slits 22. At this time, both sides of each cavity 302 are urged against both surfaces of the abutment plate 2. As such, it is impossible of moving the panel 3 away from the housing 1. By configuring as above, a user can either mount the panel 3 onto the front surface of the housing 1 from a first direction (i.e., front to rear) without involving any tools or detach the panel 3 from the housing 1 from a second opposite direction (i.e., rear to front).

Figure 4:
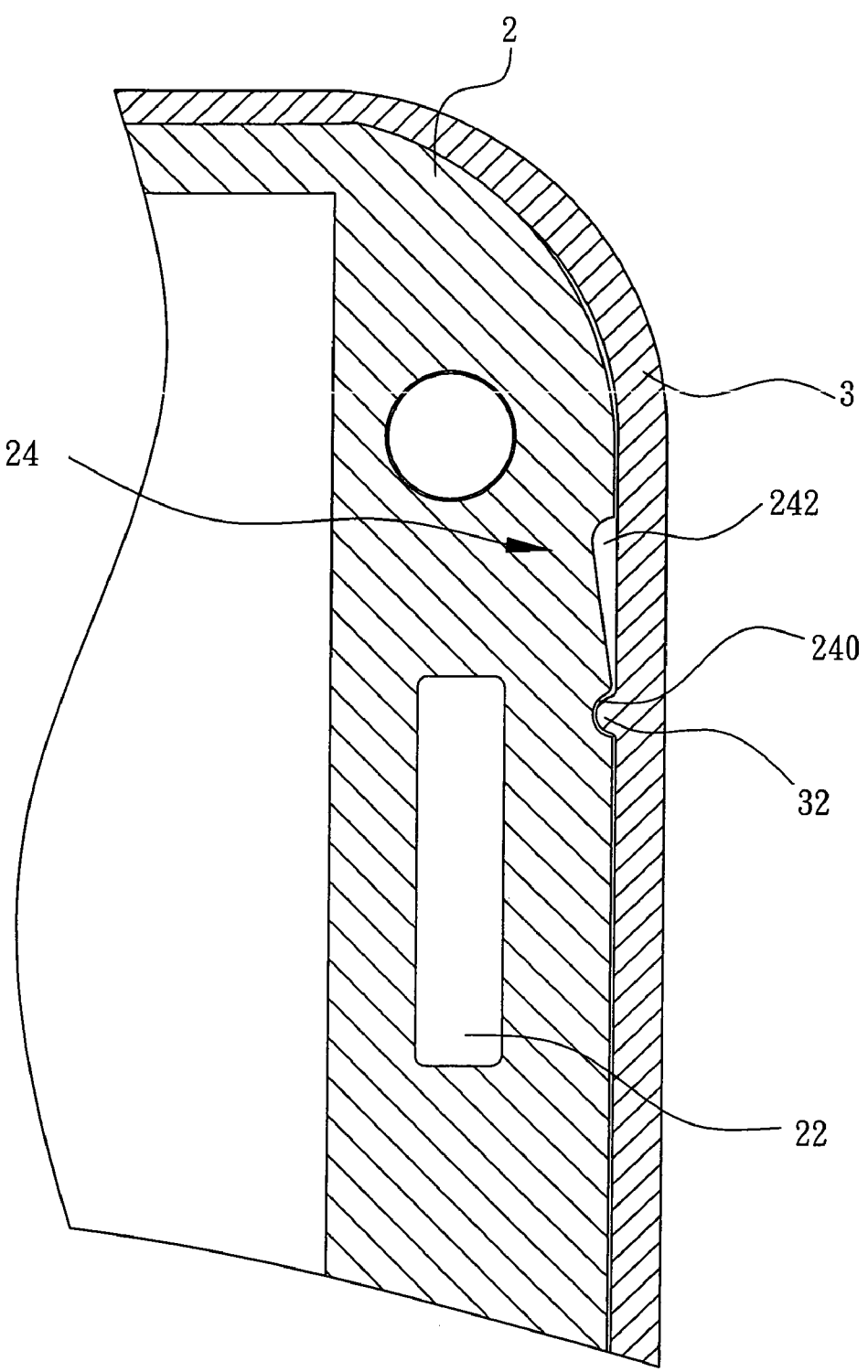
FIG. 4 is a fragmentary longitudinal sectional view of FIG. 3 showing the first and second positioning members about to secure together.
Figure 5:
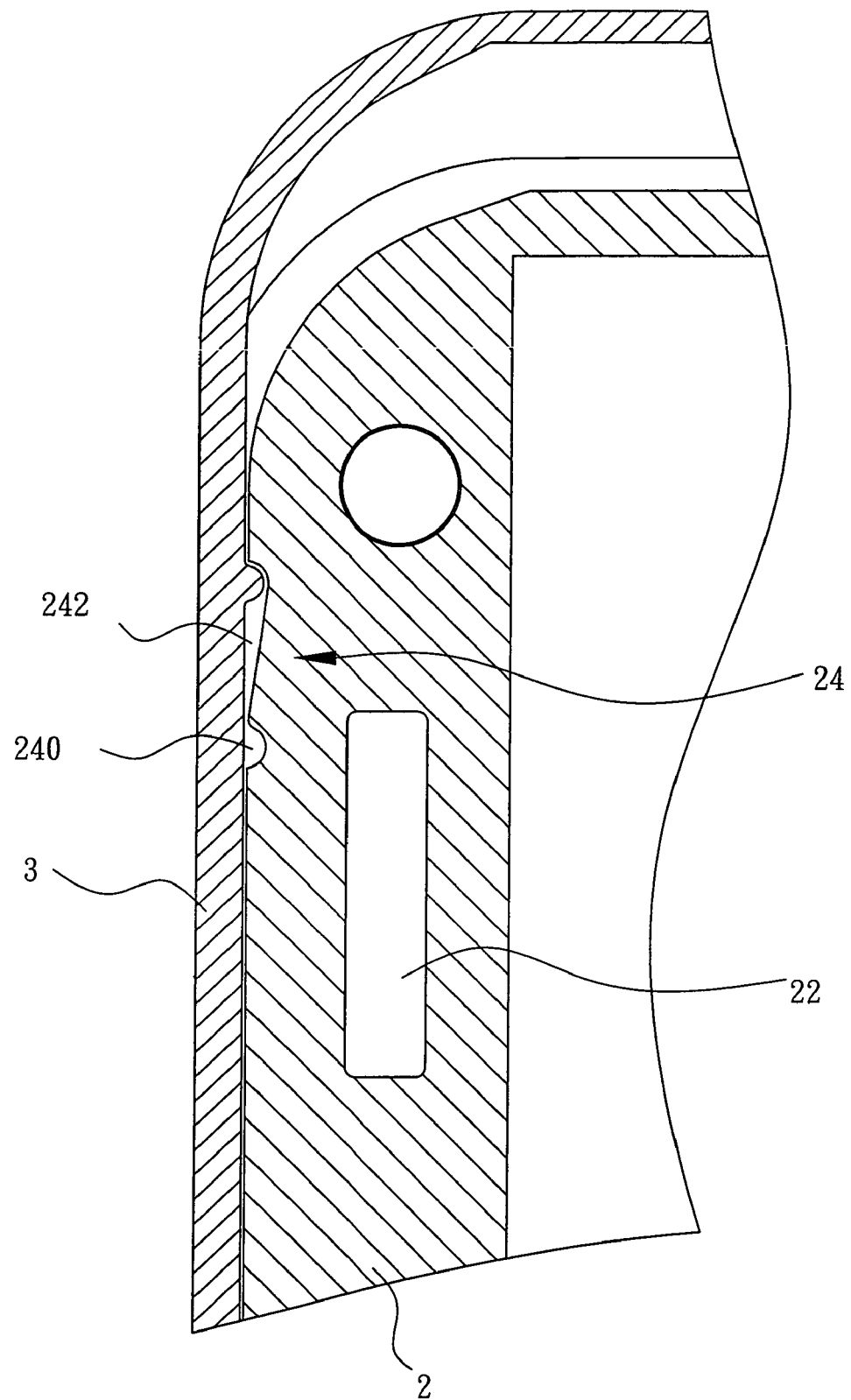
FIG. 5 is a view similar to FIG. 4 showing the secured first and second positioning members.

Referring to FIGS. 4 and 5, in the invention the first positioning member 24 comprises an arcuate recess 240 and a slope 242. The recess 240 is formed at one end of the slope 242. A distance of one end of the slope 242 adjacent the recess 240 is smaller than that of the other end of the slope 242 distal the recess 240. The second positioning member 32 is a projection 32. The projection 32 is engaged with the deeper portion of the slope 242 when the piece 300 has inserted into the slit 22. Next, move down the panel 3 to move the blind ends of the cavities 302 toward the bottoms of the slits 22 and move the projections 32 along the inclined surfaces of the slopes 242. The projections 32 just cross the peaks of the slopes 242 to fall into the recesses 240 when both sides of the cavities 302 urged against both surfaces of the abutment plate 2. As a result, the panel 3 has its periphery secured to the periphery of the abutment plate 2 onto the housing 1.

While the invention herein disclosed has been described by means of specific embodiments, numerous modifications and variations could be made thereto by those skilled in the art without departing from the scope and spirit of the invention set forth in the claims.

What is claimed is:

1. An external box for containing one or more hard disk drives (HDDs), the external box comprising:
   a housing;
   an abutment plate fitted on a front surface of the housing, the abutment plate including at least one opening in communication with inside of the housing for permitting a HDD to install in the housing through the opening, at least one slit proximate either side of the abutment plate with the opening disposed between the slits of both sides, and at least one first positioning member on a periphery of either side the abutment plate; and
   a panel adapted to fit onto the abutment plate to conceal same for forming the external box with the housing, the panel including at least one latch on either side of its inner surface facing the housing, and at least one second positioning member on either side;
   wherein the latches are adapted to insert into the slits and the second positioning members are adapted to securely engage with the first positioning members so as to secure the panel onto the front surface of the housing.

2. The external box of claim 1, wherein the latch is a substantially rectangular piece having a front end integrally formed with the panel and a rear open end extending toward the housing, the piece including a cavity on its lower side between both ends, and wherein both sides of the cavity are urged against both surfaces of the abutment plate.

3. The external box of claim 1, wherein the first positioning member includes an arcuate recess and a slope, the recess being formed at one end of the slope, a distance of one end of the slope adjacent the recess being smaller than that of the other end of the slope distal the recess, and the second positioning member being shaped as a projection whereby inserting the pieces into the slits will engage the projections with valleys of the slopes, moving blind ends of the cavities toward bottoms of the slits will move the projections along inclined surfaces of the slopes, and moving the projections across peaks of the slopes will cause the projections to fall into the recesses with both sides of the cavities being urged against both surfaces of the abutment plate.

* * * * *